A. B. Lewis.
Harvester Rake.
№ 9275                    Patented Sep. 21, 1852
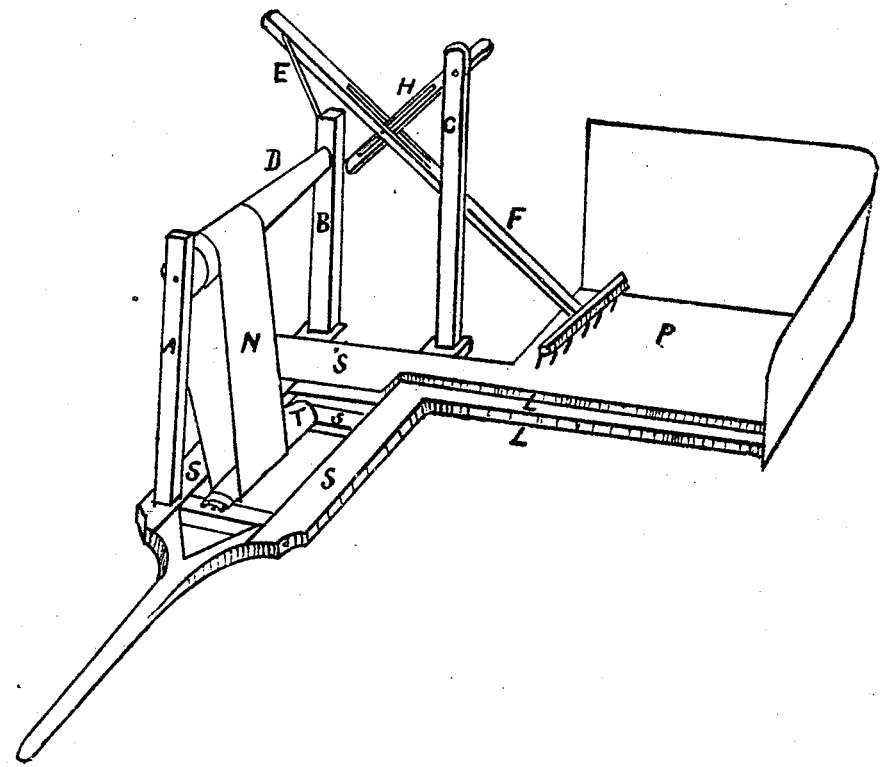

UNITED STATES PATENT OFFICE.

AMZA B. LEWIS, OF BROOKLYN, WISCONSIN.

IMPROVEMENT IN RAKES.

Specification forming part of Letters Patent No. 9,275, dated September 21, 1852.

*To all whom it may concern:*

Be it known that I, AMZA B. LEWIS, of the town of Brooklyn, in the county of Green and State of Wisconsin, have invented a new and useful machine for raking grain from the platform of reaping-machines, styled a "Self-Raker;" and I do hereby declare that the following is a full, clear, and exact description of the construction and operation of the same, reference being had to the annexed drawing, making a part of this specification, in which—

S S S represent the main timbers of the frame of a reaping-machine; P, the platform of the reaper. L marks the place where the sickle is placed, and T represents part of the shaft which carries the sickle, on which shaft has been placed a cone-shaped drum. A B C are posts erected on the frame of the reaper. D is a shaft erected on posts A and B, on which is placed a drum. N is a belt to carry shaft D by the power from or of shaft T. E is a crank attached to shaft D. F is a rake-handle attached to crank E. H is a swinging arm, hanging to post C and attached to the rake-handle F.

To enable others skilled in the art of making reaping-machines to make and use my invention, I will proceed to describe its construction and operation.

I frame two upright posts in the frame-work of a reaping-machine at the farthest practicable points from the sickle, being set in a line at right angles with the sickle, (in McCormick's, and Seymour & Morgan's, and parallel to the sickle on Hussey's reaper, &c.,) to which posts I attach a shaft at a suitable height from the frame of the reaper, which shaft is to be turned by a band or by cog-wheels from the motive power of the reaper. In the end of the shaft, at the post nearest the platform of the reaper, I attach a crank, which is to carry the rake back and forth over the platform. The end of handle farthest from rake-head is attached to the crank. Then between the post near which the crank is attached to the shaft above mentioned and the platform of the reaper I erect one other post higher than either of the two first mentioned, which I call the "gallows-post," near the top of which I attach a swinging arm, which is to be attached to the rake-handle, near the middle of said handle, for the purpose of raising the rake over the grain when it is carried back after raking the grain from the platform. The swinging arm and handle of the rake are attached together as follows, viz: A long mortise is made in both, the mortise in the rake-handle being wide enough to let the arm play in it. The arm is then slipped into the mortise in the handle. A pin is then passed through the rake-handle, near the center of the mortise, and passing through the mortise in the swinging arm, or otherwise, in such a manner as to allow the handle of the rake to slide up the arm while the crank, by means of the rake, is drawing the grain from the platform of the reaper. I also make the rake-head heavy enough to hold itself to the platform.

Now, when a machine has been made according to the above description, and when the crank is turned in a particular direction, (I think it might be called "back-handed,") the rake will draw the grain from the platform and leave it ready for binding.

What I claim as my invention, and desire to secure by Letters Patent, is—

The combination of the slotted swinging arm with the slotted rake-handle and crank E, in manner as above described, for moving the cut grain from the platform.

AMZA B. LEWIS.

Witnesses:
H. L. SMITH,
JOHN A. ROBSON.